United States Patent [19]

Bergner et al.

[11] Patent Number: 4,932,190

[45] Date of Patent: Jun. 12, 1990

[54] METHOD OF AND APPARATUS FOR ASSEMBLING AND WRAPPING ARRAYS OF CIGARETTE PACKETS AND THE LIKE

[75] Inventors: Herbert Bergner, Reinbek; Otto Blidung, Geesthacht, both of Fed. Rep. of Germany

[73] Assignee: Körber AG, Hamburg, Fed. Rep. of Germany

[21] Appl. No.: 254,173

[22] Filed: Oct. 5, 1988

[30] Foreign Application Priority Data

Oct. 16, 1987 [DE] Fed. Rep. of Germany ....... 3735040

[51] Int. Cl.⁵ ..................... B65B 35/44; B65B 35/50
[52] U.S. Cl. ......................... 53/447; 53/443; 53/57; 53/73; 53/531; 53/541; 198/418.5; 198/429
[58] Field of Search ............... 53/443, 447, 496, 54, 53/57, 73, 541, 531; 198/494, 433, 430, 429, 426, 418.5, 464.4

[56] References Cited

U.S. PATENT DOCUMENTS

| | | | |
|---|---|---|---|
| 3,269,085 | 8/1966 | Czajkowski | 53/57 X |
| 3,340,992 | 9/1967 | Seragnoli | 198/429 X |
| 3,538,992 | 11/1970 | Chauhan | 198/426 X |
| 3,954,165 | 5/1976 | Snyder | 53/496 X |
| 4,219,112 | 8/1980 | Loewenthal | 198/433 |
| 4,258,527 | 3/1981 | Steinbrecker | 53/447 |
| 4,537,550 | 8/1985 | Mojden | 53/541 X |

FOREIGN PATENT DOCUMENTS

1127810 4/1962 Fed. Rep. of Germany ........ 53/541

Primary Examiner—John Sipos
Attorney, Agent, or Firm—Peter K. Kontler

[57] ABSTRACT

Discrete cigarette packets which are supplied by a packing machine are assembled into arrays in successive compartments of a first endless conveyor at a first station, and the pockets of a second conveyor accept arrays from successive filled compartments for stepwise transport to a second station where the arrays are draped into blanks in a wrapping machine to form cartons. The second conveyor is moved stepwise during successive intervals of idleness of the first conveyor, and the first conveyor is normally moved stepwise when the second conveyor is idle. The two conveyors cross each other at the first station. The arrays in the compartments extend transversely of the first conveyor, and the arrays in the pockets extend longitudinally of the second conveyor.

26 Claims, 2 Drawing Sheets

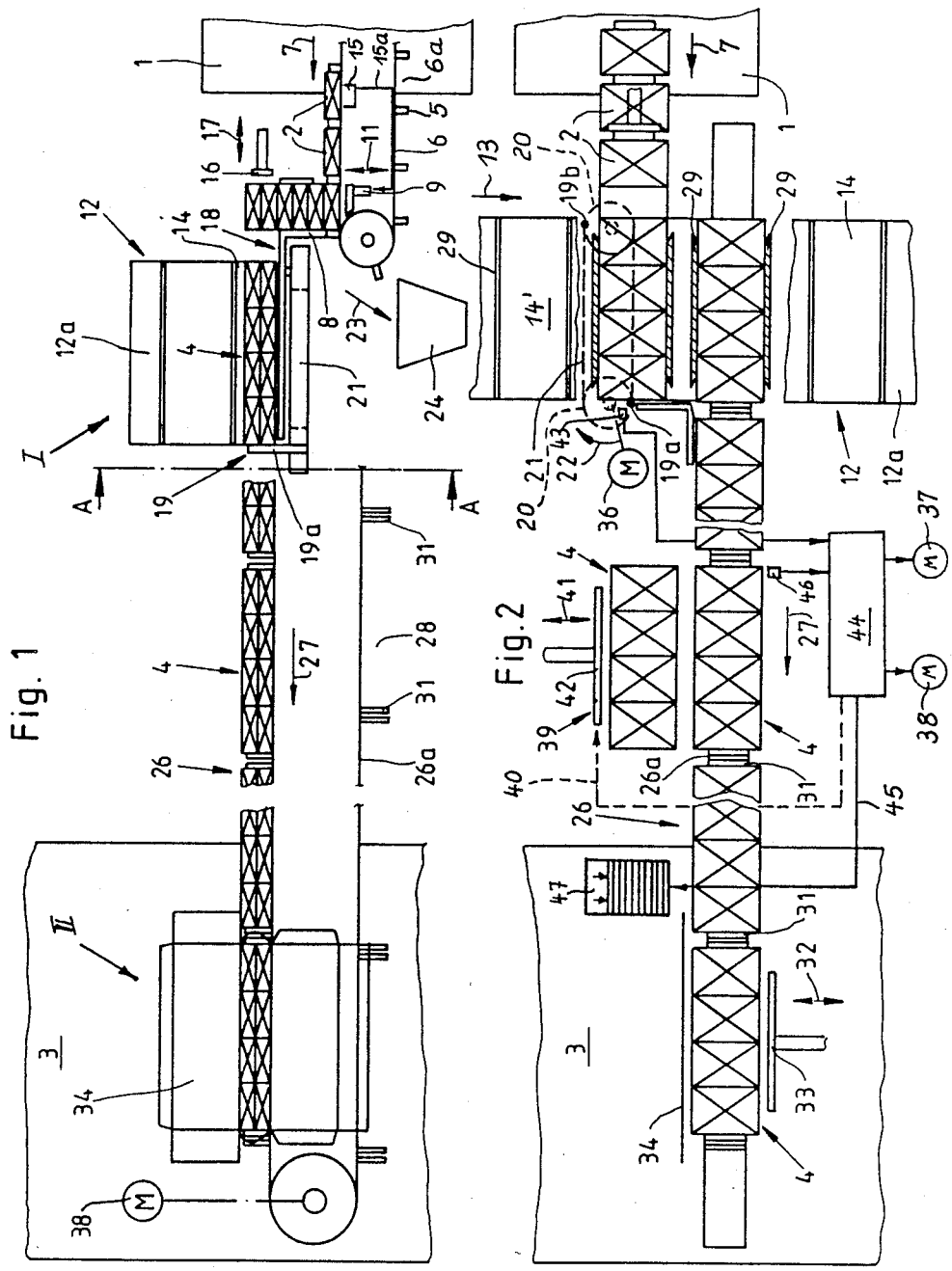

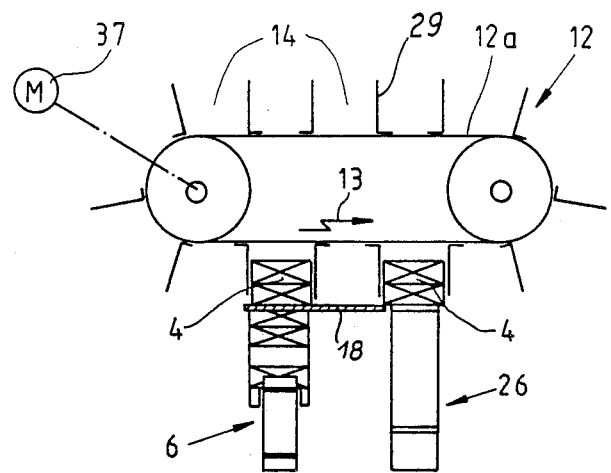

METHOD OF AND APPARATUS FOR ASSEMBLING AND WRAPPING ARRAYS OF CIGARETTE PACKETS AND THE LIKE

BACKGROUND OF THE INVENTION

The present invention relates to improvements in methods of and in apparatus for manipulating discrete cigarette packs or like commodities, and more particularly to improvements in methods of and in apparatus for converting such commodities into arrays prior to draping of the arrays into blanks of cardboard or the like. Typical examples of arrays which can be assembled and wrapped in accordance with the method and in the apparatus of the present invention are groups of cigarette packs which are to be treated in a carton making or a like wrapping machine (also known as cartoner). Reference may be had to U.S. Pat. No. 4,717,010 granted Jan. 5, 1988 to Deal et al. for "Cigarette pack accumulator assembly".

It is customary to transport discrete packets which contain cigarettes or other tobacco products between pairs of conveyor belts which engage the respective sides of discrete packets and advance them toward and into the cartoner. The packets are caused to pile up at the cartoner, and groups containing selected numbers of piled-up packets are introduced into the wrapping station where the groups are surrounded by and confined in prefabricated blanks to form therewith cartons containing eight, ten, twelve or more packets, depending on the country and on the preference of the manufacturer. It is also known to transport packets in such a way that the packets form stacks each of which contains two superimposed packets.

OBJECTS OF THE INVENTION

An object of the invention is to provide a novel and improved method of accumulating and processing arrays of discrete commodities, such as cigarette packets.

Another object of the invention is to provide a method which renders it possible to turn out cartons of cigarette packets at regular intervals even if the rate of accumulation of packets into arrays, which are being draped into blanks in order to form cartons, fluctuates within a rather wide range.

A further object of the invention is to provide a method which renders it possible to achieve savings in wrapping material for arrays of discrete commodities and which ensures that each and every piece of wrapping material is used for the making of wrapped arrays.

An additional object of the invention is to provide a novel and improved apparatus for the practice of the above outlined method.

Still another object of the invention is to provide a novel and improved connection between a packer which turns out packets of cigarettes and a cartoner which drapes arrays of packets into blanks of cardboard or the like.

A further object of the invention is to provide the apparatus with novel and improved conveyors for accumulation of discrete commodities into arrays and for the transport of arrays to a processing station.

Another object of the invention is to provide the apparatus with novel and improved means for preventing contamination of the wrapping machine with unused blanks when the wrapping machine fails to receive arrays of discrete commodities at prescribed intervals of time.

A further object of the invention is to provide the apparatus with novel and improved means for controlling the movements of various conveyors and other movable parts.

An additional object of the invention is to provide a production line for use in a tobacco processing plant which embodies the above outlined apparatus.

A further object of the invention is to provide the apparatus with novel and improved means for aligning the commodities during accumulation into arrays.

SUMMARY OF THE INVENTION

One feature of the present invention resides in the provision of a method of converting discrete commodities (particularly packets of tobacco-containing products) into wrapped arrays of commodities. The method comprises the steps of accumulating commodities at a first station into a series of arrays each of which contains a predetermined number of commodities in a predetermined orientation relative to each other, transporting successive arrays of the series along a predetermined path from the first station to a wrapping machine at a second station while the predetermined orientation of commodities forming the arrays in the predetermined path remains unchanged, and wrapping successive arrays at the second station.

The wrapping step can include carrying out with the wrapping machine wrapping operations at a predetermined frequency, and the method can further comprise the step of establishing in the path a gap between successive arrays when the accumulation of arrays at the first station is carried out at a frequency which is less than the predetermined frequency so that the machine performs at least one idle cycle when a gap arrives at the second station. The wrapping step can include supplying to the second station blanks and draping the blanks around successive arrays, and the method can further comprise the step of interrupting the supplying of blanks to the second station when the machine performs idle cycles or strokes.

Each array which contains a predetermined number of commodities can consist of several overlapping rows or layers of commodities.

In order to avoid the need for idle cycles or strokes of the wrapping machine, the method can further comprise the steps of establishing and maintaining a supply of spare arrays adjacent the predetermined path, and introducing spare arrays into the gaps ahead of the second station when the accumulation of arrays at the first station is slower than the wrapping of arrays at the second station, i.e., when the line of successive arrays in the predetermined path exhibits one or more gaps as a result of the absence of one or more arrays.

The accumulating step can include gathering discrete commodities into a pile of superimposed commodities, and transferring successive pairs of commodities off the top of the pile into the first station.

Another feature of the present invention resides in the provision of an apparatus for converting discrete commodities, particularly packets of tobacco-containing products, into wrapped arrays of commodities. The improved apparatus comprises a source of commodities, means for accumulating at a first station commodities arriving from the source into a series of arrays each of which contains a predetermined number of commodities in a predetermined orientation relative to each other, a wrapping machine which is disposed at a second station spaced apart from the first station, and means for transporting successive arrays of the series of arrays from the first station to the wrapping machine along a predetermined path in such a way that the predetermined orientation of commodities which form the arrays in the predetermined path remains at least substantially unchanged.

The accumulating means can include means for supplying commodities from the source to the first station in a first direction, a conveyor having a series of compartments for discrete arrays of commodities, means for intermittently driving the conveyor in a second direction transversely of the first direction so that a compartment registers with the first station when the conveyor is idle, and means for transferring commodities from the supplying means into the compartment at the first station. The transporting means can include a second conveyor having a series of pockets and defining the predetermined path, and means for intermittently driving the second conveyor so that the pockets accept arrays from filled compartments of the conveyor which forms part of the accumulating means. The predetermined path preferably extends transversely of the second direction. The arrangement is such that successive pockets of the second conveyor register with successive compartments of the other conveyor during successive intervals of idleness of the two conveyors. The transferring means can comprise a reciprocable pusher. Such pusher can be designed to simultaneously transfer a plurality of commodities, e.g., stacks of pairs of superimposed commodities. The accumulating means can further comprise an aligner which cooperates with the pusher to ensure predictable transfer of commodities from the supplying means into the compartment at the first station. The aligner can comprise at least one mobile stop and means for moving the stop in synchronism with the pusher. Such moving means can include means for moving the stop in stepwise fashion through distances corresponding to the length of a commodity (as measured in the first direction). The moving means can include an endless conveyor (such as a toothed belt) for the stop, and motor means for advancing the endless conveyor in stepwise fashion. In accordance with a presently preferred embodiment of the apparatus, the aligner comprises two spaced-apart stops one of which is aligned with the pusher while the pusher transfers commodities into the compartment at the first station.

The compartmentized conveyor is preferably an endless belt or chain conveyor, and the conveyor of the transporting means is preferably a similar or analogous endless belt or chain conveyor defining a series of pockets for discrete arrays of commodities.

It is presently preferred to construct the accumulating means in such a way that it comprises a first endless conveyor which serves to transport discrete commodities from the source of commodities toward the first station, a duct or turret at the first station, elevator means for transferring successively supplied commodities from the first conveyor into the duct from below so that the duct accumulates a pile of superimposed commodities, a second conveyor having a series of compartments for discrete arrays, means fore intermittently advancing the second conveyor so as to locate successive compartments at the first station, and means for transferring commodities off the top of the pile in the duct into the compartment at the first station. Such apparatus can further comprise means for monitoring the condition of commodities on the first conveyor and for generating signals upon detection of defective commodities, and means for arresting the elevator means in response to such signals so that defective commodities can bypass the duct. The first conveyor preferably extends beneath the duct, and defective commodities are then transported by the first conveyor beneath and beyond the duct to be discharged into a receptacle or other suitable means for receiving defective commodities.

The apparatus which embodies he just outlined accumulating means further comprises means for intermittently driving the second conveyor and the conveyor of the transporting means, means for monitoring the compartment at the first station and for generating additional signals when the transfer of a predetermined number of commodities into the compartment at the first station takes up more than a predetermined interval of time, and control means for the driving means. The control means is responsive to additional signals to delay the driving of the second conveyor until after the completion of accumulation of an array in the compartment at the first station.

The driving means preferably comprises discrete first and second motors for the second conveyor of the accumulating means and for the conveyor of the transporting means, respectively, so that the second motor can intermittently advance the conveyor of the transporting means while the compartmentized conveyor is at a standstill in response to the additional signals.

The apparatus can further comprise means for monitoring the second conveyor and for transmitting to the control means further signals in response to detection of empty pockets in the predetermined path. Such apparatus further comprises means for supplying to the second station blanks for draping around successive arrays in the wrapping machine, and means for effecting an interruption of the delivery of blanks by the blank supplying means in response to further signals so that the second station does not receive a blank when an empty pocket reaches the second station.

The apparatus can also comprise a magazine or another suitable source of preassembled spare arrays adjacent the predetermined path, and means for transferring spare arrays into empty pockets of the conveyor of the transporting means in response to further signals. The means for transferring spare arrays can comprise a reciprocable pusher and means for operatively connecting the pusher for spare arrays with the control means, i.e., with the monitoring means which transmits further signals in response to detection of an empty pocket in the predetermined path.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is a fragmentary schematic side elevational view of an apparatus which embodies a presently preferred form of the invention;

FIG. 2 is partly plan and partly horizontal sectional view of the apparatus which is shown in FIG. 1; and FIG. 3 is a transverse sectional view as seen in the direction of arrows from the line A—A of FIG. 1.

DESCRIPTION OF PREFERRED EMBODIMENTS

The apparatus of the present invention serves to transport block-shaped commodities in the form of cigarette packets 2 from a source 1 (such as a packing machine for making packets containing groups of twenty cigarettes each) to a wrapping machine 3 (particularly a cartoner) wherein arrays 4 of packets 2 are confined in cardboard boxes, e.g., in a manner as disclosed in commonly owned U.S. Pat. No. 4,653,248 granted Mar. 31, 1987 to Bergner et al. for "Apparatus for making cartons of cigarette packs and the like".

The improved apparatus comprises means for accumulating packets 2 which issue from the packing machine 1 (hereinafter called packer for short) into arrays 4, and means for transporting the arrays 4 from the accumulating means to the cartoner 3. The accumulating means assembles packets 2 into arrays 4 at a first station I, and the cartoner 3 confines successive arrays 4 in blanks 34 of cardboard or the like at a second station II which is remote from the first station I. The means for supplying packets 2 from the packer 1 to the first station I comprises a so-called cleated belt conveyor 6 whose upper reach advances successive packets 2 from the outlet of the packer 1 in the direction of a double-headed arrow 7 (see FIG. 1) toward the first station I where such packets are piled up in an upright duct or turret 8 to form a stack of superimposed packets. A vertically movable elevator 9 is provided beneath the duct 8 to perform alternating upward and downward strokes (note the double-headed arrow 11 in FIG. 1) so as to transfer successive discrete packets 2 from the discharge end of the supplying conveyor 6 into the lower end portion of the duct 8 and to thus intermittently raise the stack of superimposed packets into the range of a transferring device in the form of a pusher 16 which is reciprocable in directions indicated by a double-headed arrow 17. The conveyor 6 carries partitions 5 defining a row of discrete pockets or compartments 6a each of which can receive a single packet 2.

The accumulating means further comprises an intermittently driven endless belt conveyor 12 having transversely extending partitions 29 which define with an endless belt 12a a series of compartments or pockets 14 for discrete arrays 4 of eight packets 2 each. Each such array comprises two overlapping rows or layers of four packets 2 each. Otherwise stated, each array 4 comprises four neighboring stacks of two packets 2 each. Such arrays are not very customary in the United States wherein a carton normally comprises two rows of five packets each. The exact number of packets 2 in an array is immaterial insofar as the method and apparatus of the present invention are concerned, i.e., the conveyor 12 can be readily designed to accumulate arrays of five, ten, twelve or more packs, and the cartoner 3 is then designed to convert blanks and selected numbers of properly arrayed packets into a succession of cartons each including an array of packets and an envelope or box of lightweight cardboard or the like. The means for intermittently driving the conveyor 12 comprises a suitable stepping motor 37 (see FIGS. 2 and 3). The direction in which the conveyor 12 is intermittently driven by the motor 37 is indicated by an arrow 13. It will be noted that the conveyor 12 transports the arrays 4 at right angles to the direction of advancement (arrow 7) of discrete packets 2 with the upper reach of the supplying conveyor 6.

Each compartment 14 of the conveyor 12 extends transversely of the direction which is indicated by the arrow 13, i.e., it extends in the direction of arrow 7. The arrangement is such that the elevator 9 performs eight upward strokes and the pusher 16 performs four forward strokes during each interval of idleness of the conveyor 12 so that the pocket 14 which happens to be located at the first station I (in alignment with the pusher 16) receives a full array 4 of eight properly oriented packets 2 forming two superimposed horizontal layers or rows of four packets each, i.e., four stacks of two superimposed packets each. The position and dimensions of the pusher 16 are selected in such a way that it transfers a stack of two superimposed packets 2 during each of its forward strokes. The freshly transferred stack pushes the preceding stack (if any) longitudinally of the compartment 14 at the first station I so that the array grows stepwise and is fully assembled after the pusher 16 completes four forward strokes provided, of course, that the duct 8 is properly filled so that it maintains two topmost packets 2 of the pile of packets therein in the path of forward movement of the pusher 16 when the latter performs a forward stroke in the direction of arrow 7. The lower packet 2 of the stack of two superimposed packets which are transferred by the pusher 16 when the latter performs a forward stroke slides along a horizontal track 18 (see FIGS. 1 and 3) which is located beneath the compartment 14 that is aligned with the pusher 16. The track 18 (e.g., a horizontal plate-like platform) extends transversely of the compartment 14 which is in the process of receiving pairs of packets 2 so that this platform can support from below a freshly formed array 4 which is in the process of moving from a position of register with the pusher 16 to a position of register with an empty compartment or pocket 28 of an endless belt conveyor 26 forming part of or constituting the aforementioned means for transporting arrays 4 from the first station I to the second station II. The conveyor 12 is idle when the conveyor 26 is in motion between two successive intervals of idleness, and vice versa.

The conveyor 12 cooperates with a stepwise operated aligning or orienting conveyor 19 which is installed at the first station I and has a set of stops one of which is located in front of the foremost stack of two superimposed packets 2 in that compartment 14 of the conveyor 12 which is in the process of gathering an array 4. The illustrated aligning and orienting conveyor 19 (hereinafter called aligner) comprises two spaced-apart stops 19a, 19b which are secured to an endless toothed belt 21. The belt 21 is driven stepwise in synchronism with the pusher 16 so that it performs a forward stroke and advances the stop 19a or 19b longitudinally of the compartment 14 which is in the process of receiving stacks of two packets 2 each from the pusher 16. The length of steps (in the direction of arrow 7) which are performed by the belt 21 of the aligner 19 matches or closely approximates the length of forward strokes of the pusher 16. FIG. 2 shows that the belt 21 is trained about two pulleys 20 which are rotatable about vertical axes. This enables the belt 21 to remove the stop 19a from the front end face of a fully grown array 4 in the respective compartment 14 of the conveyor 12 and to place the other stop 19b at the inlet end of the adjacent empty compartment 14 of the conveyor 12. To this end, the belt 21 performs an additional stroke after each fourth forward stroke of the pusher 16 so that the stop 19a or 19b moves around the respective pulley 20 in the direction of arrow 22 and is thus moved laterally of an away from the front end face of the fully grown array 4. When the belt 21 completes the just mentioned additional stroke, the stop 19a moves to the twelve o'clock position of the left-hand pulley 20 (as seen in FIG. 2) and the stop 19b moves to the six o'clock position of the right-hand pulley 20, i.e., the stop 19b is ready to advance stepwise in front of the foremost stack of two packets 2 during the next forward stroke of the pusher 16 whereby such foremost stack enters the foremost empty compartment 14' of the conveyor 12 after the conveyor 12 is caused to advance by a step in a downward direction, as seen in FIG. 2. An advantage of the aligner 19 is that it ensures the assembly of successive pairs of superimposed packets 2 into arrays 4 having a predetermined number of packets which are maintained in a predetermined orientation so that each fully grown array 4 can be readily accepted by the adjacent empty compartment 28 of the conveyor 26. Each stepwise advance of the conveyor 12 entails a movement of the freshly formed array 4 along the upper side of the platform or track 18 into the adjacent empty compartment 28 while the conveyor 26 is idle. The conveyor 26 is then advanced by a step in the direction of arrow 27 in order to move the freshly accepted array 4 by a step toward the second station II, namely along an elongated horizontal or nearly horizontal path extending between the stations I and II.

The apparatus further comprises means for monitoring the packets 2 on the upper reach of the supplying conveyor 6 and for arresting the elevator 9 when a defective packet 2 advances into a position of register with the pile of superimposed packets 2 in the duct or turret 8. This enables the conveyor 6 to advance the defective packet beyond the elevator 9 (which then dwells in its lower end position) and to discharge the defective packet in the direction of arrow 23 (FIG. 1) so that such packet enters a collecting or receiving receptacle 24 or descends directly onto a continuously or discontinuously driven conveyor which delivers defective packets to a cigarette or tobacco recovering station of any known design. Cigarette and/or tobacco recovering means are disclosed in numerous United States and foreign Letters Patent of the assignee of the present application. The same applies for the means for monitoring packets of cigarettes or other smokers' products for integrity or lack of integrity, i.e., to ascertain whether or not each packet has a transparent or translucent outer envelope, whether or not the packets are provided with customary revenue labels, whether or not the packets are provided with tear strips, etc.

FIG. 1 shows schematically a conventional monitoring device 15 which is adjacent the conveyor 6 and generates signals in response to detection of defective packets 2. Such signals are used by an arresting device. including signal transmitting conductor means 15a to interrupt the operation of the elevator 9 so that defective packets 2 can advance beneath the duct 8 toward and beyond the discharge end of the conveyor 6 in order to descend into the collecting or receiving receptacle 24.

The conveyor 26 of the means for transporting arrays 4 from the first station I to the second station II comprises an endless belt 26a which carries partitions 31 defining the aforementioned compartments 28 for discrete arrays 4 of eight packets 2 each. The means for intermittently advancing the upper reach of the belt 26a in the direction of arrow 27 comprises a stepping motor 38 (FIGS. 1 and 2) which receives signals from a control circuit 44, the same as the motor 37 for the conveyor 12. The upper reach of the conveyor 26a defines an elongated path extending transversely of the direction which is indicated by the arrow 13, i.e., transversely of the direction of movement of successive compartments 14 at the first station I.

The partitions 29 of the conveyor 12 are adjacent the longer sides of the arrays 4 therein (see FIG. 2). On the other hand, the partitions 31 of the conveyor 26 are adjacent the front and rear end faces of the arrays 4 which are in the process of advancing from the first station I toward the second station II. The partitions 29, 31 cooperate with the platform or track 18 to ensure that the transfer of arrays 4 from the compartments 14 into the compartments 28 takes place without any or without appreciable changes of orientation of packets 2 which form the arrays, i.e., the configuration of arrays 4 remains unchanged all the way from the locus where an array is formed by the pusher 16 in cooperation with the stop 19a or 19b, track or platform 18 and two partitions 29 to the locus where the cartoner 3 accepts the array 4 from the foremost filled compartment 28 of the conveyor 26.

The cartoner 3 comprises a reciprocable transfer element or pusher 33 (FIG. 2) which is reciprocable in directions indicated by a double-headed arrow 32 to expel a complete array 4 from the foremost filled compartment 28 of the conveyor 26 (while the conveyor 26 is idle) into the cartoner 3 proper, namely, into engagement with a selected portion of a blank 34 which is maintained in a position of readiness at the second station II. Reference may be had again to the aforementioned commonly owned U.S. Pat. No. 4,653,248 to Bergner et al. which discloses a presently preferred mode of assembling successive arrays and corresponding blanks into cartons wherein the converted blanks form boxes or envelopes closely following the outlines of the respective arrays. A device which serves to supply blanks 34 to the station II at required intervals, so that a freshly supplied blank 34 can be draped around the foremost array 4, is shown schematically at 47. This supplying device 47 receives, via conductor means 45, signals from the control circuit 44 which ensures that no blank 34 is delivered to the station II when the compartment 28 which has been advanced into a position of register with the pusher 33 is empty. The cartoner 3 then completes an idle cycle without making a carton.

The exact construction of means for transmitting motion from the motor of the packer 1 to the conveyor 6, from a motor 36 to the belt 21 of the aligner 19, to the elevator 9 and pushers 16 and 33, from the motor 37 to the belt 12a of the conveyor 12, from the motor 38 to the belt 26a of the conveyor 26, and to other moving parts of the improved apparatus forms no part of the present invention. Such motion transmitting means can comprise cam and follower drives, rack and pinion drives, electromagnets and/or others. Signals for the operation of means for transmitting motion to the conveyor 26 as well as to the pusher 33 preferably originate in the cartoner 3 which is normally driven at a constant speed so that it performs cycles at a selected frequency. The operational speed of the packer 1 is more likely to vary because it depends on the ability of one or more cigarette makers to deliver requisite quantities of plain or filter cigarettes per unit of time.

As already mentioned above, the operation of the motor 36 for the aligner 19 is preferably synchronized with that of the means (e.g., an electromagnet or a double-acting fluid-operated motor) for reciprocating the pusher 16. The motor 36 is normally idle when the pusher 16 is arrested so that it does not transfer pairs of packets 2 from the upper end of the duct or turret 8 into the adjacent compartment 14 of the conveyor 12.

The apparatus further comprises a magazine 39 which is adjacent the path of movement of arrays 4 from the station I toward the station II and contains a supply of spare arrays 4 which can be gathered by hand or automatically and are maintained in positions of readiness to be introduced into the adjacent empty compartments 28 during the intervals of idleness of the conveyor 26. The means for transferring spare arrays 4 from the magazine 39 into the adjacent empty compartments 28 comprises a pusher 42 which is movable in directions indicated by a double-headed arrow 41.

The cartoner 3 is set up in such a way that its output (cartons or packets per minute) exceeds the output of the packer 1. Furthermore, the cartoner 3 is operated at a constant speed in contrast to the packer 1 whose speed varies. When the number of packets 2 issuing from the packer 1 decreases so that the compartment 14 which is aligned with the pusher 16 does not receive a total of eight packets 2 during an operating cycle of the cartoner 3, the upper reach of the endless belt 26a forming part of the conveyor 26 (whose speed is constant) develops a gap between two neighboring arrays 4, i.e., a compartment 28 on the upper reach of the belt 26a is empty. A suitable monitoring device 46 detects the absence of the gap and transmits an appropriate signal to the control circuit 44 which, in turn, transmits a signal to the device 47 which interrupts the delivery of blanks 34 to the second station II, i.e., the cartoner 3 is caused to go through its motions but in fact merely performs an idle stroke at the time the gap (empty compartment 28) on the upper reach of the belt 26a reaches the station II and is aligned with the pusher 33. The monitoring device 46 can include any suitable photoelectronic detector whose transducer transmits a signal to the control circuit 44 whenever the device 46 detects the absence of an array 4 in the adjacent compartment 28 of the conveyor 26. It goes without saying that the signal which the control circuit 44 receives from the monitoring device 46 is delayed so that the supplying device 47 interrupts the delivery of blanks 34 to the cartoner 3 at the exact moment when the empty compartment 28 registers with the pusher 33. Such time delay arrangements (which can employ one or more shift registers) are customary in machines for the processing of tobacco and tobacco products, e.g., in cigarette makers wherein they ensure that a cigarette which has been found to be defective is segregated from satisfactory cigarettes when it reaches a predetermined portion of its path from the cigarette maker to the packer in order to ensure that the defective cigarette enters a collecting receptacle or a conveyor which transports defective cigarettes to the tobacco recovering machine.

The monitoring device 46 can be provided in addition to or in lieu of a monitoring device 43 which serves to detect the extent to which the compartment 14 in register with the pusher 16 is filled with packets 2, and the device 43 transmits signals to the corresponding input of the control circuit 44 when the accumulation of eight packets 2 in such compartment 14 is not completed within an interval of time which is required by the cartoner 3 to complete a cycle.

Of course, the operative connection (conductor means 45) between the control circuit 44 and the blank supplying device 47 can be interrupted or deactivated if the improved apparatus is equipped with the aforementioned magazine 39 and pusher 42. The motor which reciprocates the pusher 42 then receives a signal from the control circuit 44 (note the operative connection 40 in FIG. 2), and such signal initiates a forward stroke of the pusher 42 so that the empty compartment 28 on the upper reach of the belt 26a receives a spare array 4 from the magazine 39 while such the compartment 28 registers with the pusher 42.

The pushers 33 and 42 are retracted when the conveyor 26 is in motion, the conveyor 26 is at a standstill when the conveyor 12 is in motion, and the conveyor 12 is idle when the conveyor 26 is in motion. In addition, the conveyor 12 is set in motion to advance by a step only when the compartment 14 which registers with the pusher 16 contains a full array 4 (i.e., eight packets 2 which form two overlapping rows or layers of four packets each). The motor for the pusher 16 can cause the pusher 16 to perform a forward stroke only when the conveyor 12 maintains an empty or partially filled compartment 14 in a position of alignment with this pusher.

Instead of employing the control circuit 44, the apparatus of the present invention can be equipped with a computer which initiates the movements of various mobile components in accordance with a preselected program.

An important advantage of the improved apparatus is that the cartoner 3 invariably receives arrays 4 which are ready to be draped into blanks 34 irrespective of the frequency at which the packer 1 turns out packets 2. This is due to the fact that the conveyor 26 invariably transports satisfactory arrays, i.e., the compartments 28 which are defined by the upper reach of the conveyor belt 24a are filled with satisfactory arrays 4 or are empty. The operative connection 45 between the control circuit 44 and the supplying device 47 ensures that no blanks 34 are wasted, i.e., that the device 47 delivers to the second station II a blank 34 only when such blank is about to be contacted by a longer side of the array 4 which is then in register with the pusher 33. This reduces the likelihood of clogging of the cartoner 3 with wasted blanks. Furthermore, and since the cartoner 3 need not be arrested when the path between the stations I and II contains an empty compartment 28, the making of each carton is invariably completed.

The magazine 39 can be caused to supply spare arrays 4 automatically (in response to signals from the control circuit 44 via operative connection 40). Alternatively, empty compartments 28 can be filled with spare arrays 4 by hand.

While it is possible to design the pusher 16 in such a way that it transfers one packet 2 at a time, the illustrated design is preferred at this time because complete arrays normally contain several layers of packets.

The aligner 19 can be modified in a number of ways without departing from the spirit of the invention. For example, the belt 21 can carry a single stop 19a or 19b. The utilization of two stops is preferred at this time because it takes less time to place a stop in front of an empty compartment 14 when the assembly of an array 4 is completed.

The control circuit 44 is designed to prevent the motor 37 from advancing the conveyor 12 by a step when the assembly of a full array 4 is not completed within the contemplated interval of time, i.e., if the interval which is required to complete the assembly of a satisfactory array 4 in the compartment 14 which registers with the pusher 16 takes longer than a complete cycle of the cartoner 3. However, the motor 38 continues to operate the conveyor 26 at regular intervals so that one or more compartments or pockets 28 then remain empty and move stepwise toward positions of alignment with the pusher 33. As mentioned above, the monitoring devices 43 and 46 then enable the control circuit 44 to ensure that the device 47 does not deliver a blank 34 to the second station II when an empty compartment 28 is in register with the pusher 33.

A further important advantage of the improved method and apparatus is that the making of defective cartons is highly unlikely or practically impossible. This is due to the fact that the cartoner 3 is permitted to complete each of its cycles irrespective of the presence or absence of a complete array 4 at the station II. Moreover, and as explained above, the device 47 is prevented from supplying a blank 34 to the station II when such station does not receive an array 4. The partitions 29, 31 cooperate with each other, with the respective belts 12a and 26a as well as with the track or platform 18 to ensure that the orientation and mutual positions of packets 2 in the arrays 4 remain unchanged all the way from the station I to the station II. Such highly predictable transfer and advancement of arrays 4 is further ensured by the aforedescribed positioning of the conveyors 12 and 26 relative to each other, i.e., so that the conveyor 26 crosses the conveyor 12 at the station I and that the conveyor 12 is idle when the conveyor 26 is in motion and vice versa.

An additional important advantage of the improved apparatus is that it establishes as flexible connection between the packer 1 and the cartoner 3. Thus, when the packer 1 is arrested or is incapable of delivering packets 2 at the desired or expected rate, the cartoner 3 is free to continue its operation and to form additional cartons until the supply of satisfactory arrays 4 between the stations I and II is exhausted. This reduces the likelihood of making unsatisfactory cartons, e.g., as a result of drying of adhesive on selected portions of blanks 34 at the station II while the conveyor 26 is incapable of delivering arrays 4. The device 47 supplies a blank 34 only when such blank is certain to encounter a satisfactory array containing a prescribed number of packets 2 in a predetermined orientation relative to each other and relative to the pusher 33.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. A method of converting discrete commodities, particularly packets of tobacco-containing products, into wrapped arrays of commodities, comprising the steps of accumulating commodities at a first station into a series of arrays each of which contains a predetermined number of commodities in a predetermined orientation relative to each other; transporting successive arrays of said series along a predetermined path from a first station to a wrapping machine at a second station so that the predetermined orientation of commodities of the arrays in said path remains at least substantially unchanged; monitoring said first station and generating a signal when the accumulation of a predetermined number of commodities into an array takes up more than a predetermined interval of time; advancing the arrays in said path toward the second station in response to said signal; and wrapping successive arrays at said second station.

2. The method of claim 1, wherein said wrapping step includes carrying out with the machine wrapping operations at a predetermined frequency and said advancing step entails the establishment in said path of a gap between successive arrays when the accumulation of arrays at the first station is carried out at a frequency which is less than said predetermined frequency so that the machine performs at least one idle cycle when a gap arrives at the second station.

3. The method of claim 2, wherein said wrapping step includes supplying to the second station blanks and draping the blanks around successive arrays, and further comprising the step of interrupting the supplying of blanks to the second station when the machine performs idle cycles.

4. The method of claim 1, wherein each array containing a predetermined number of commodities has a plurality of superimposed rows of commodities.

5. The method of claim 1, wherein said advancing step entails the establishment in said path of a gap between successive arrays of said series when the accumulation of arrays at said first station is slower than the wrapping of arrays at said second station, and further comprising the steps of establishing and maintaining a supply of spare arrays, and introducing spare arrays into the gaps ahead of said second station.

6. The method of claim 1, wherein said accumulating step includes gathering discrete commodities into a pile of superimposed commodities, and transferring successive pairs of commodities off the top of the pile into said first station.

7. Apparatus for converting discrete commodities, particularly packets of tobacco-containing products, into wrapped arrays of commodities, comprising a source of commodities; means for accumulating commodities from said source at a first station into a series of arrays each of which contains a predetermined number of commodities in a predetermined orientation relative to each other, said accumulating means comprising a first conveyor having a series of compartments for discrete arrays of commodities, means for intermittently driving said conveyor in a predetermined direction so that a compartment registers with said first station when said conveyor is idle, and means for supplying commodities to said compartments in a plurality of successive stages so as to accumulate a full array in said compartment at said first station, a wrapping machine disposed at a second station spaced apart from said first station; and means for transporting successive arrays of said series from the firs station to said machine along a predetermined path extending transversely of said predetermined direction so that the predetermined orientation of commodities forming the arrays in said path remains at least substantially unchanged, said transporting means including a second conveyor having a series of pockets and defining said path, and means for intermittently driving said second conveyor so that the pockets of said second conveyor accept arrays from filled compartments of said first conveyor, successive pockets of said second conveyor coinciding with successive compartments of said first conveyor during successive intervals of idleness of said conveyors.

8. The apparatus of claim 7, wherein said supplying means includes means for supplying commodities to said first station in a second direction transversely of said predetermined direction, said accumulating means further comprising means for transferring commodities from said supplying means into the compartment at said first station.

9. The apparatus of claim 8, wherein said transferring means includes a reciprocable pusher.

10. The apparatus of claim 9, wherein said pusher comprises means for simultaneously transferring a plurality of commodities.

11. The apparatus of claim 9, wherein said accumulating means further comprises an aligner cooperating with said pusher to ensure predictable transfer of commodities from said supplying means into the compartment at said first station.

12. The apparatus of claim 7, wherein said first conveyor is an endless conveyor.

13. The apparatus of claim 7, wherein said means for supplying commodities to said first station comprises a further conveyor arranged to supply discrete commodities from said source toward said first station, a duct at said first station, and elevator means for transferring successively supplied commodities from said further conveyor into said duct from below so that the duct accumulates a pile of superimposed commodities, said transferring means including means for transferring commodities off the top of the pile in said duct into the compartment at said first station.

14. The apparatus of claim 13, further comprising means for monitoring the condition of commodities on said first conveyor and for generating signals upon detection of defective commodities, and means for arresting said elevator means in response to said signals so that defective commodities can bypass said duct.

15. The apparatus of claim 14, wherein said further conveyor extends beneath said duct and defective commodities are transported by said further conveyor beneath and beyond said duct, and further comprising means for receiving defective commodities from said first conveyor.

16. The apparatus of claim 7, further comprising means for monitoring the compartment at said first station and for generating signals when the transfer of said predetermined number of commodities into the compartment at said first station takes up more than a predetermined interval of time, and control means for said driving means, said control means being responsive to said signals to delay the driving of said first conveyor until after the completion of accumulation of an array in the compartment at said first station.

17. The apparatus of claim 16, wherein said driving means comprises discrete first and second motors for said first and second conveyors, respectively, so that the second motor can intermittently advance said second conveyor while said first conveyor is at a standstill in response to said signals.

18. The apparatus of claim 16, further comprising means for monitoring said second conveyor and for transmitting to said control means second signals in response to detection of an empty pocket in said path.

19. The apparatus of claim 18, further comprising means for supplying to said second station blanks for draping around successive arrays in said wrapping machine, and means for effecting an interruption of the delivery of blanks by said blank supplying means in response to said second signals so that said second station does not receive a blank when an empty pocket reaches said second station.

20. The apparatus of claim 18, further comprising a source of spare arrays adjacent said path, and means for transferring spare arrays into empty pockets of said second conveyor in response to said second signals.

21. The apparatus of claim 20, wherein said source comprises a magazine and said means for transferring spare arrays comprises a pusher and means for operatively connecting said pusher with said control means.

22. Apparatus for converting discrete commodities, particularly packets of tobacco-containing products, into wrapped arrays of commodities, comprising a source of commodities; means for accumulating commodities from said source at a first station into a series of arrays each of which contains a predetermined number of commodities in a predetermined orientation relative to each other, said accumulating means including means for supplying commodities to said first station in a first direction, a conveyor having a series of compartments for discrete arrays of commodities, means for intermittently driving said conveyor in a second direction transversely of said first direction so that a compartment registers with said first station when said conveyor is idle, and means for transferring commodities from said supplying means into the compartment at said first station, said transferring means including a reciprocable pusher and said accumulating means further comprising an aligner cooperating with said pusher to ensure predictable transfer of commodities from said supplying means into the compartment at said first station, said aligner comprising at least one mobile stop and means for moving said stop in synchronism with said pusher; a wrapping machine disposed at a second station spaced apart from said first station; and means for transporting successive arrays of said series from the first station to said machine along a predetermined path so that the predetermined orientation of commodities forming the arrays in said path remains at least substantially unchanged.

23. The apparatus of claim 22, wherein said moving means includes means for moving the stop in stepwise fashion through distances corresponding to the length of a commodity in said first direction.

24. The apparatus of claim 22, wherein said moving means includes an endless conveyor for said stop and motor means for advancing the endless conveyor in stepwise fashion.

25. The apparatus of claim 24, wherein said endless conveyor includes a toothed belt.

26. The apparatus of claim 24, wherein said aligner comprises two spaced-apart stops one of which is aligned with said pusher while the pusher transfers commodities into the compartment at said first station.

* * * * *